United States Patent [19]

Chivari

[11] 4,307,585
[45] Dec. 29, 1981

[54] ELASTIC COUPLING

[76] Inventor: Ilie Chivari, Berlinerstrasse 1, 4690 Herne 2, Fed. Rep. of Germany

[21] Appl. No.: 115,144

[22] Filed: Jan. 24, 1980

Related U.S. Application Data

[63] Continuation of Ser. No. 868,053, Jan. 9, 1978, Pat. No. 4,224,807.

[30] Foreign Application Priority Data

Jan. 28, 1977 [DE] Fed. Rep. of Germany ....... 2703481

[51] Int. Cl.$^3$ .............................................. F16D 3/80
[52] U.S. Cl. ........................................ 64/27 L; 64/26
[58] Field of Search ............. 64/26, 27 R, 27 L, 15 R, 64/15 B

[56] References Cited

U.S. PATENT DOCUMENTS

| B 509,043 | 2/1976 | Geislinger | 64/27 L |
| 2,266,872 | 12/1941 | Kuhns | 64/27 L |
| 2,363,257 | 11/1944 | Matteucci | 64/27 L |
| 4,104,891 | 8/1978 | Geislinger | 64/27 L |

FOREIGN PATENT DOCUMENTS

| 341206 | 9/1921 | Fed. Rep. of Germany | 64/27 L |
| 749197 | 1/1945 | Fed. Rep. of Germany | 64/27 L |
| 1206219 | 8/1960 | Fed. Rep. of Germany | 64/27 L |
| 1202590 | 5/1966 | Fed. Rep. of Germany | 64/27 L |
| 1222324 | 2/1967 | Fed. Rep. of Germany | 64/27 L |
| 2154796 | 8/1974 | Fed. Rep. of Germany | 64/27 L |
| 337263 | 7/1939 | Italy | 64/27 L |

Primary Examiner—Ira S. Lazarus
Attorney, Agent, or Firm—Laney, Dougherty, Hessin & Beavers

[57] ABSTRACT

An elastic coupling comprises an outer ring and a hub. A plurality of radially extending stacks of leaf springs are attached to the outer ring and engage axially extending recesses in the hub. Each leaf spring comprises a set of radially extending strips in axially adjacent coplanar arrangement, namely of one or more central strips and axially outer strips on both sides of the central strips and having smaller width than the central strips. Intermediate pieces are provided between the leaf springs along the inner surface of the outer ring. Each intermediate piece includes a radially outer surface. A radially extending slot disposed in each intermediate piece communicates with the radially outer surface thereby dividing a radially outer part of the intermediate piece into first and second portions on either side of the radially extending slot. An axially extending conical bore is disposed in each intermediate piece and communicates with the radially extending slot. An axial bolt having a conical shaft is disposed in the conical bore of each intermediate piece and engages the first coupling member so that upon tightening of the bolt the first and second portions of the intermediate piece are spread peripherally apart thereby clamping each stack of leaf springs between two adjacent intermediate pieces.

2 Claims, 3 Drawing Figures

ELASTIC COUPLING

RELATED APPLICATIONS

This application is a continuation of my previously filed U.S. patent application Ser. No. 868,053, filed Jan. 9, 1978, now U.S. Pat. No. 4,224,807.

BACKGROUND OF THE INVENTION

1. Field of the Invention

This invention relates generally to elastic couplings for coupling two rotating mechanical devices. The invention more particularly relates to an elastic coupling comprising: a first coupling member having an outer ring, an inner second coupling member having axial recesses, and a plurality of substantially radially extending leaf spring means having inner and outer ends, said leaf spring means being mounted with their outer ends in said first coupling member and extending with their free inner ends into said axial recesses, each of said leaf spring means comprising a plurality of axially adjacent strips.

2. Description of the Prior Art

A shaft coupling having radial leaf spring means is known, for example, from German Pat. No. 1,202,590. With this prior art arrangement each stack of leaf springs consists of a plurality of superimposed substantially radial leaf springs. Some of the super imposed leaf springs have the same lengths and extend radially inwards into the axially extending recesses of the inner second coupling member. Only on one side of these leaf springs, the stack of leaf springs comprises additional leaf springs of lengths reduced in steps. The stacks of leaf springs are held by intermediate pieces. These intermediate pieces have substantially trapezoidal cross section, which becomes narrow radially inwards. The outer surfaces of the intermediate pieces are cylindrical and are curved about the axis of the outer ring. The outer ring has a conical inner surface, and a slotted ring having a correspondingly conical outer surface is located between the outer ring and the intermediate pieces. When the outer ring and the slotted ring are tensioned towards each other by screw bolts, which tighten the two cover members, the slotted ring will, at the same time, be contracted in peripheral direction, and this will cause also contraction of the intermediate pieces in peripheral direction and clamping of the stacks of leaf springs.

Due to the rings, which have to be quite solid, as they are to perform the clamping function, a considerable proportion of the radial dimensions of the coupling gets lost and cannot be utilized for spring length and thus for increased elasticity of the coupling.

As the shorter leaf springs do not engage the recesses of the inner second coupling member, they become effective with one direction of rotation only in which they are taken along by the bent longer leaf springs while they remain inoperative with the opposite direction of rotation. Thus with the latter direction of rotation this coupling has a different spring characteristic and a smaller transmittable torque than with the former direction of rotation.

Mounting of the leaf spring means is effected by frictional contact with the rings and not by positive engagement.

It is also known to fill the sealed inner cavity of such an elastic shaft coupling with a damping liquid. Chambers are defined by the stacks of leaf springs, and the volumes of these chambers are expanded or reduced by vibrations of the coupling members relative to each other. The damping liquid displaced thereby through the narrow slots between these chambers causes damping of the vibrations (German Pat. No. 1,206,219). Such slots are formed both between the intermediate pieces and the inner second coupling member and between the stacks of leaf springs and the cover members.

With this coupling the stacks of leaf springs comprise central, long leaf springs, which engage the axially extending recesses of the inner second coupling member and, on both sides of these long leaf springs, additional leaf springs of stepwise reduced length.

In order to permit angular offset of the coupling members, the intermediate pieces and the inner coupling member face each other with concave and convex, respectively, spherical surfaces. In the prior art arrangement, radial offset of two shafts to be coupled with each other is permitted by two angularly movable elastic shaft couplings which are combined with an intermediate shaft portion to form a universal-joint shaft.

With the prior art shaft coupling, the two coupling members cannot be radially movable relative to each other, because such radial mobility would require correspondingly wide slots, for example between the intermediate pieces and the inner second coupling member and, correspondingly, would ruin the damping. Also, even a deformation of the leaf springs by twisting in the case of purely angular offset would affect the slot width between the stack of leaf springs and the cover members. It is not possible to adjust the damping in accordance with the individual requirements.

By the symmetric design of the stacks of leaf springs, the same spring characteristic is obtained for both directions of rotation. However, only half of the shorter leaf springs become effective with each of the two directions of rotation.

Furthermore, an elastic coupling of this type with oil damping is known (German Pat. No. 1,222,324) with which sealing ledges are provided between the intermediate pieces and the inner second coupling member in the planes of symmetry of the intermediate pieces. Thereby the inner cavity of the shaft coupling is subdivided into chambers, each of which is in turn subdivided into two partial chambers by the stack of leaf springs. Oil supply passages end on the bottom of the axially extending recesses, which are engaged by the stacks of leaf springs, said passages extending within the inner second coupling member and communicating with a filling pump through a restrictor. In the position of rest of the coupling, oil return passages end in the planes of the sealing ledges guided in the intermediate pieces. With rotation of the coupling members relative to each other in one direction, the stacks of leaf springs bend and engage the surface of the axially extending recesses. Then oil from the filling pump is pumped through the oil supply passages into the chamber formed on the opposite side of the stacks of leaf springs. The chambers on said one side of the stacks of leaf springs are connected to the return passages due to the angular displacement of the sealing ledges. Thereby the leaf springs are supported by the filling pump pressure in a sense counteracting the deflection. With vibration of the coupling members relative to each other, in addition, oil is urged through the slots between the stacks of leaf springs and the cover members as well as the second coupling member, and thus damping of these vibrations is achieved.

With this coupling the static seal between the cover members of the first coupling member and the second coupling member precludes any radial mobility.

With all couplings described, all leaf springs have to be twisted to permit angular displacement. Such twisting is opposed with considerable torque by the leaf springs, such torque loading the bearings of the parts to be coupled. Therefore the angular offset permitted by such prior art shaft couplings is only small as compared to existing requirements.

Couplings have already been provided, in which each leaf spring means consists of two axially adjacent strips of equal width. Such a two-part arrangement is, however, not able to solve the problems mentioned in unobjectionable manner. Each individual strip namely is subjected to twisting, when the coupling members are angularly offset, said twisting resulting in strong curvatures in the axially outer areas of each strip and in a substantially smaller curvature in the axially inner areas of the strip. This strong curvature of the outer area of each strip relative to the inner one integral therewith results in considerable elastic restraint against the twisting, and this is not changed substantially by subdividing the leaf spring means into two strips of equal width.

Another problem is that with such an angular offset the slots formed between the leaf springs and the adjacent parts of the coupling will vary, whereby the damping characteristic of the coupling can vary uncontrollably.

SUMMARY OF THE INVENTION

The elastic coupling of the present invention includes a first coupling member having an outer ring and a second coupling member located axially inward from the outer ring. The second coupling member has a plurality of axially extending recesses in its outer peripheral surface. A plurality of radially extending leaf springs having inner and outer ends are attached at their outer ends to the outer ring and engage, with their inner ends, the axial recesses of the second coupling member. Each leaf spring comprises a set of radially extending strips arranged in an axially adjacent coplanar manner. The leaf spring includes an axially central strip with an axially outer strip on each side of the central strip. The axial width of the outer strips is less than the axial width of the central strip.

When an angular offset occurs between the two rotating mechanical devices to be coupled, deflection occurs in the axially outer strips of each leaf spring, without that deflection affecting the adjacent central strip. Although each strip is subjected to a certain torsion or twisting, these torsional forces cause considerably less restraint against angular offset of the coupling members, with the multiple strip arrangement of the present invention, than would be the case in the prior art devices which have one single continuous leaf spring or a pair of rather wide strips comprising a leaf spring.

It is therefore a general object of the present invention to provide an elastic coupling which provides for greater angular offset between the two rotating mechanical devices to be coupled, with a corresponding smaller resistance thereto.

Another object of the present invention is to provide an elastic coupling of the type including a plurality of radially extending leaf springs engaging first and second coupling members, wherein each leaf spring is comprised of at least one axially central strip, and an axially outer strip on each side of said central strip, with the outer strips having smaller axial width than the inner strip.

Yet another object of the present invention is to provide an elastic coupling having leaf springs comprised of stacks of leaves, the peripherally outer leaves being shorter than the peripherally inner leaves, wherein means is provided for transmitting forces from the peripheral outer leaves of one leaf spring to the peripherally outer leaves of an adjacent leaf spring.

Yet a further object of the present invention is to provide an elastic coupling of the type having intermediate pieces between the leaf springs, said intermediate pieces dividing the cavity of the elastic coupling into chambers, and including connection passages between said chambers having adjustable restrictions therein.

Another object of the present invention is to provide an elastic coupling wherein all the leaves of each leaf spring are utilized to transmit the rotational force from the first coupling member to the second coupling member, when the elastic coupling is rotating in either direction.

Yet another object of the present invention is the provision of an elastic coupling having an improved sealing means between the intermediate pieces and the second coupling member.

Yet a further object of the present invention is the provision of an elastic coupling having intermediate pieces comprising convex support surfaces for engagement with the leaf springs upon rotation of the elastic coupling.

Other and further objects, features and advantages of the present invention will be readily apparent to those skilled in the art upon a reading of the description of preferred embodiments which follows when taken in conjunction with the accompanying drawings.

DETAILED DESCRIPTION OF THE PREFERRED EMBODIMENTS

Figure 1:
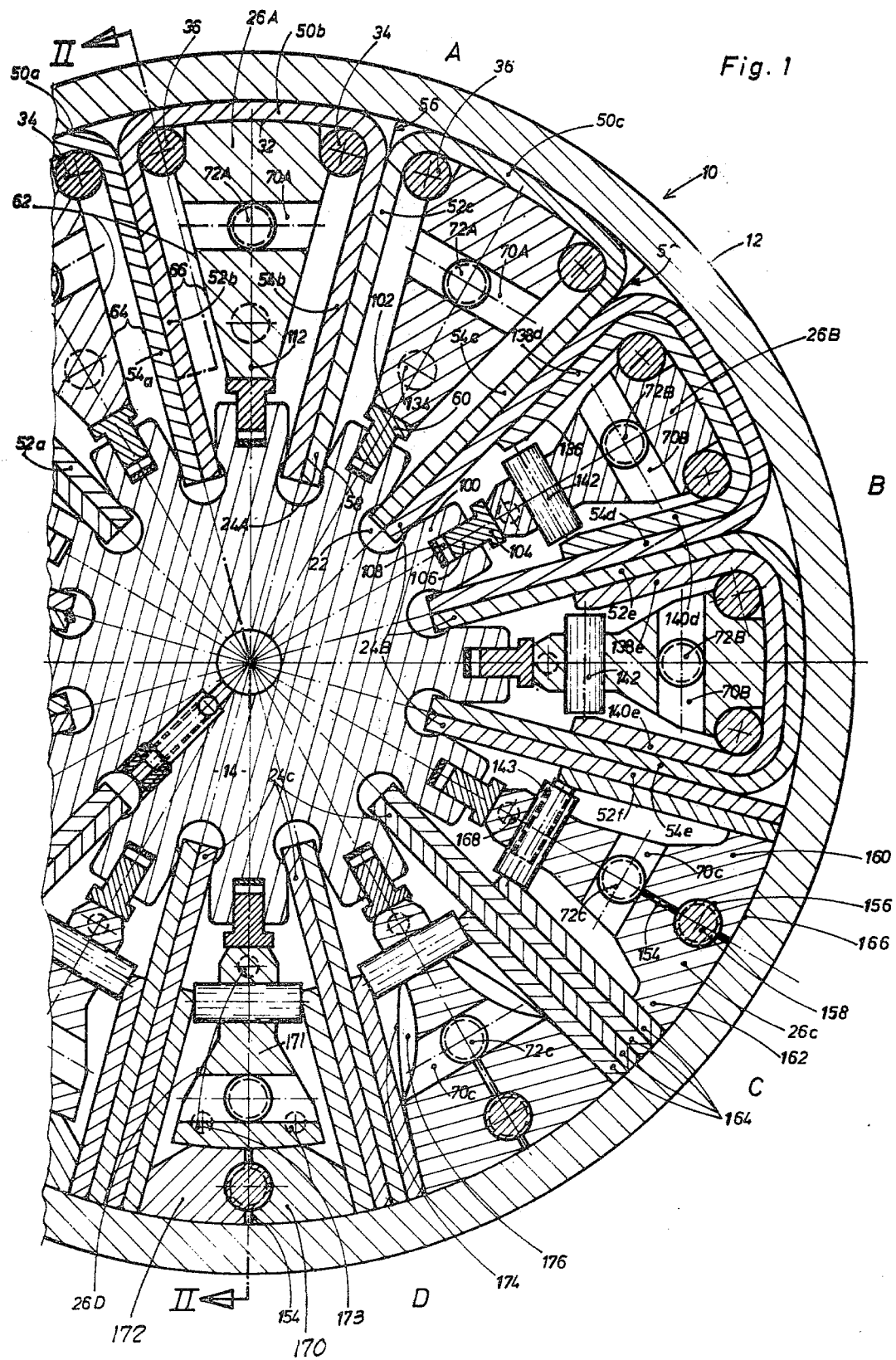
FIG. 1 shows a cross sectional view of an elastic shaft coupling of the invention along line I—I of FIG. 2.

Four different embodiments of the invention are shown in the sectors A, B, C and D, respectively, in FIG. 1.

The elastic shaft coupling of the invention comprises a first coupling member 10 with an outer ring 12, and an inner second coupling member 14 having a hub 16. The first coupling member 10 has a cover member 18, on one side of the outer ring 12, and an annular cover member 20 surrounding the hub 16, on the other side of the outer ring 12. On its peripheral surface the hub 16 of the inner second coupling member 14 has axially extending recesses 22, which are attached to the first coupling member 10, extend therefrom radially inwards and are designated by 24A, 24B and 24C and engage these recesses 22 with their free ends. Sector-shaped intermediate pieces 26A, 26B and 26C, respectively, are provided between the individual leaf spring means 24A, 24B and 24C, respectively, and are connected to the first coupling member 10. Another embodiment of an intermediate piece is designated 26D. The second coupling member 14 has a flange 28 with a circular array of holes 30, by means of which the coupling member can be screwed to an engine flywheel or a shaft.

With the embodiment illustrated in section A of FIG. 1, the cylindrical radially outer surfaces 32 of the intermediate pieces 26A are radially spaced inwardly from the outer ring 12. Therefore arcuate flat channels are formed between the intermediate pieces 26A and the outer ring 12. Pairs of axial bolts 34 and 36 are located between the intermediate pieces 26A and inward of the outer ring 12 of the first coupling member 10. U-shaped spring sheet metal strips 38, 40, 42, 44, 46 and 48 (FIG. 2) are held with their central portions 50a, 50b, and 50c each between an associated intermediate piece 26A and the outer ring 10 and are bent radially inwards around a respective bolt 36 and 34, to form the leaf spring means. Each spring sheet metal strip has radially inwardly engaging legs 52a, 54a, 52b, 54b, 52c and 54c which engage the respective legs 54 or 52, respectively, of the peripherally adjacent spring sheet metal strips. Therefore, each leaf spring means 24A is formed by the abutting legs 54a, 52b or 54b, 52c, etc., respectively, of peripherally adjacent spring sheet metal strips.

Figure 2:
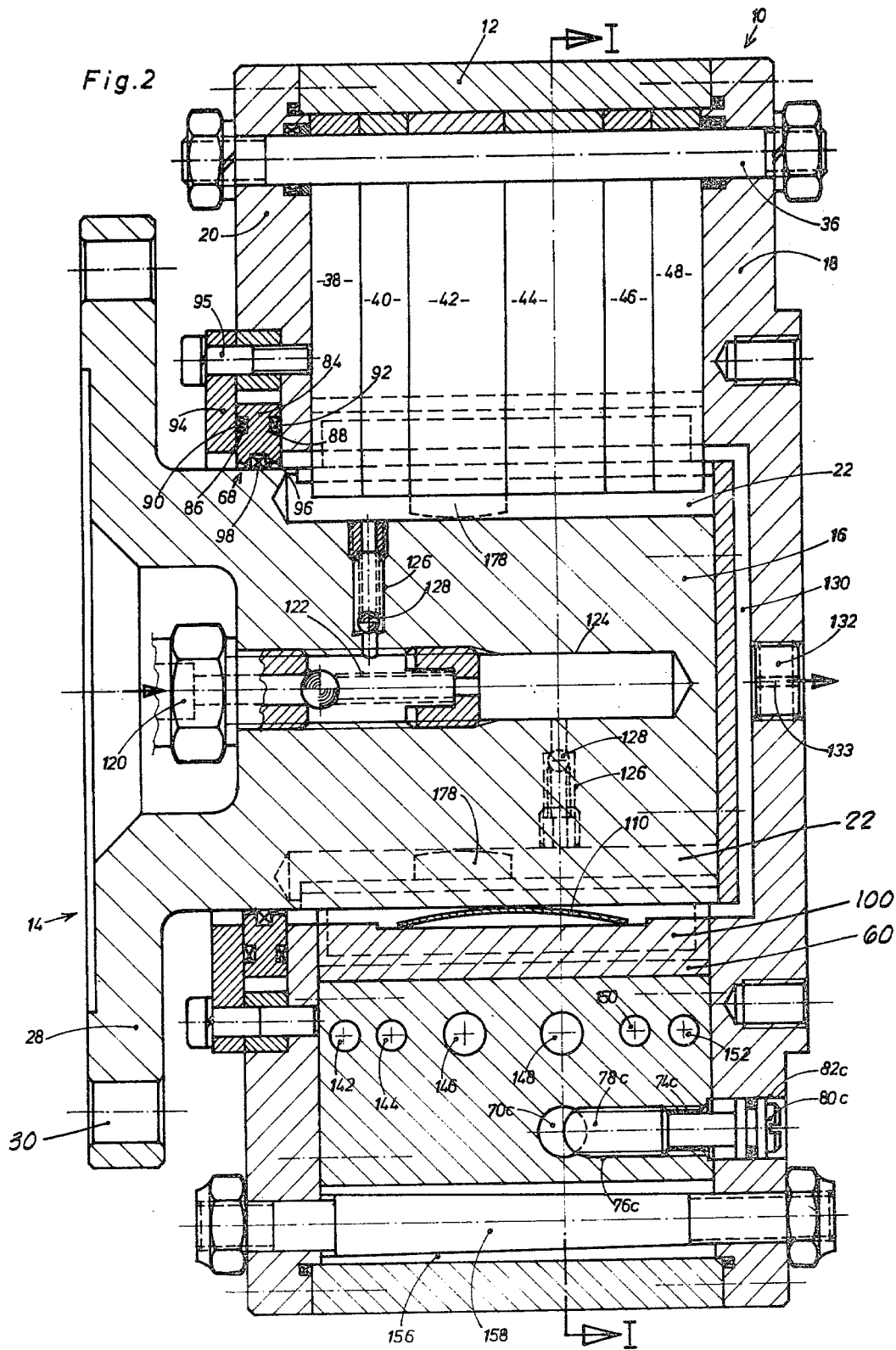
FIG. 2 shows a longitudinal sectional view along line II—II of FIG. 1.

As can be seen from FIG. 2, each leaf spring means, furthermore, consists of a plurality of separate strips 38, 40, 42, 44, 46 and 48 closing up in axial direction, instead of a continuous leaf spring extending over the whole width as in the prior art. As mentioned before, this permits an angular offset of the coupling members 10 and 14 relative to each other, without this angular offset being counteracted by an undesirably large restraint due to the twisting. Small slots are formed between the individual strips 38, 40, 42, 44, 46 and 48, in order not to impede the relative movement of the strips. With regard to the liquid damping still to be described, these slots should, however, be closed. For this reason each leaf spring means 24A comprises a continuous thin and flexible sealing plate 56 extending axially over the various strips 38, 40, 42, 44, 46 and 48. This sealing plate 56 may, for example, consists of thin spring sheet metal the thickness of which is substantially smaller than that of the strips 38 to 48. The sealing plate 56 seals the slots formed between the strips 38 to 48 but due to its small thickness counteracts any twisting with small restraint only. In the embodiment shown in FIG. 2, two narrow strips 38, 40 and 46, 48 are provided on both sides axially on the outside, and two strips 42 and 44 of greater width are provided therebetween.

The axially extending recesses 22 of the second coupling member 14 having substantially circular cross section, so that they form a neck 58 of reduced width, in which the ends of the abutting legs, for example 54b and 52a, are held rather tightly. The ends of the spring sheet metal strips have some centimeters clearance in radial direction within the recesses. Radial sealing ledges 60 are provided between the intermediate pieces 26A, 26B or 26C and the inner second coupling member 14, so that the cavity defined between the outer ring 10, the second coupling member and the two cover members 18 and 20 arranged on both sides of an outer ring is subdivided into chambers 62 by the intermediate pieces 26A, 26B, 26C and the sealing ledges 60. Each of these chambers 62 is again subdivided into two partical chambers 64 and 66 by the leaf spring means 24A or 24B or 24C, respectively. The said cavity is sealed towards atmosphere by a seal 68 provided between the cover member 20 and the hub 16, and is filled with a viscous liquid such as oil. The individual chambers 62 are interconnected by restricted connection passages 70A, 70B or 70C in the intermediate pieces 26A, 26B or 26C, respectively. As shown at the bottom of FIG. 2, each restrictor comprises a bore 74C extending axially within the intermediate piece, for example 26C, which bore intersects the connecting passage 70C. A restrictor body 78C is screwed into a screw thread 76C of the bore 74C, said body 78C extending into the connecting passage 70C and restricting the same. The restrictor body 78C is adjustable by means of a slotted head 80C, which is sealingly located within a bore 82C of the cover member 18. Thereby the restriction of the connecting passage 70C and thus the damping of the elastic shaft coupling is adjustable.

The seal 68 is designed to permit radial offset between the first coupling member 10 and the second coupling member 14 as well as a limited angular offset and axial mobility. To this end the seal 68 comprises a ring 84, which has an annular groove 86 and 88, respectively, on each of its end faces. Sealing rings 90 and 92, respectively, of polytetrafluoroethylene or a fluorocaoutchouc are arranged in the annular grooves 86 and 88, respectively. The sealing ring 92 engages the outer end face of the cover member 20. The sealing ring 90 engages the inner end face of a ring 94, which is affixed to the cover member 20 by means of screws 95, whereby the ring 84 is guided between the cover member 20 and the ring 94. The ring 84 has a peripheral groove 96 along its toroidal inner circumferential surface, said groove 96 accomodating a sealing ring 98 of polytetrafluoroethylene or fluorocaoutchouc, which engages the peripheral surface of the hub 16 between the axially extending recesses 22 and the flange 28. The design of the ring 84 permits angular movement between the parts. Furthermore, axial movement and radial movement of the coupling members 10 and 14 is possible.

If requirement, a similar sealing arrangement (not shown) may be provided on the side of the cover member 18.

Radially projecting ledges 100 extending toward the intermediate pieces 26A, 26B or 26C, respectively, are provided between the recesses 22 of the second coupling member 14 engaged by the leaf spring means 24A, 24B and 24C. The leaf spring means 24A, 24B and 24C engage these ledges 100 at a distance outwards, of the ends held in the recesses 22, when a predetermined angle of rotation between the first and second coupling members 10 and 14, respectively, has been exceeded. This design offers two advantages. First, the sealing surfaces 102 at the inner ends of the intermediate pieces 26A, 26B or 26C is displaced radially outwards. This permits a larger angle of rotation, until the leaf spring means 24A, 24B and 24C engage the intermediate pieces 26A, 26B and 26C, and thereby limit the angle of rotation, than with a coupling where the intermediate pieces extend inwards to closely adjacent the inner ends of the leaf spring means. Furthermore, the effective lever arm of the torque acting on the leaf spring means from the second coupling member 14 is increased by the abutment of the leaf spring means 24A, 24B or 24C, because this torque no longer acts on the leaf spring means at the neck 58 of the recess 22 but acts through the radially outer edge of the ledge 100. The effective lever arm of the leaf spring means 24A, 24B or 24C becomes shorter. Thus the forces are reduced and the coupling becomes stiffer.

The sealing ledges 60 have T-shaped cross section, the transverse beam 104 of the "T" engaging the sealing surface 102 of the intermediate pieces 26A, 26B or 26C and the radial base 106, i.e., the vertical beam of the "T", is guided in an axial groove 108 of the second coupling member 14. In the embodiment described, this axial groove 108 is provided in the projecting ledge 100, which is slightly shorter than the distance of the cover members 18 and 20 from each other. A leaf spring 110 (FIG. 2) keeps the sealing ledge 60 in engagement with the sealing surface 102.

Figure 3:
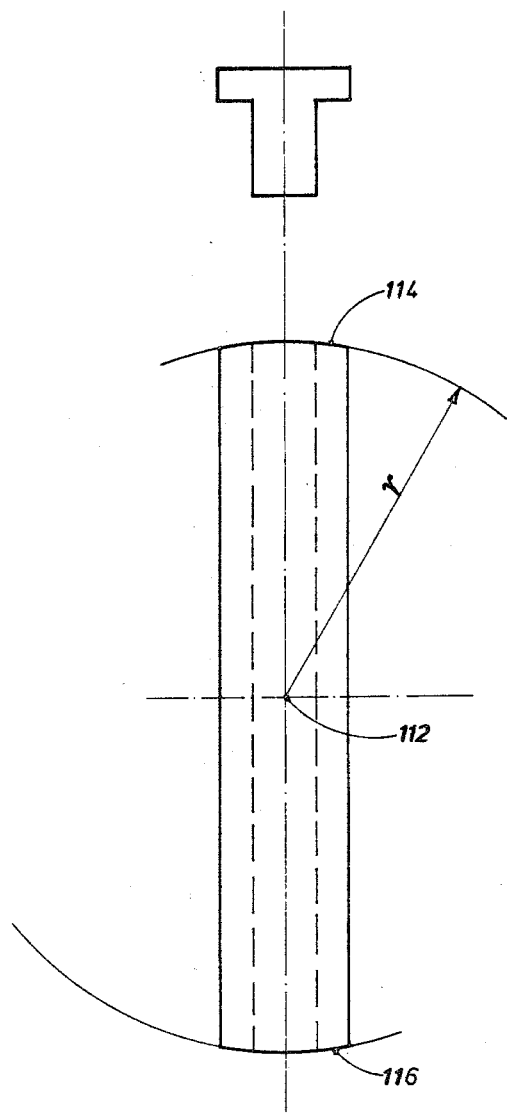
FIG. 3 shows a detail of the sealing ledges.

The contact surfaces of the sealing ledges 60 engaging the intermediate pieces 26A, 26B or 26C and the corresponding sealing surfaces 102 of the intermediate pieces are plane. In a plan view as viewed in radial direction, each of the sealing ledges 60 has curved end faces having a radius of curvature of r (FIG. 3) which is equal to half the distance of the two cover members 18 and 20. In this way, rotary movement of the second coupling member 14, with the sealing ledge 60 guided therein, about the radial central axis 112 of this sealing ledge becomes possible, the end faces 114 and 116 of the sealing ledge curved about this central axis remaining in contact with the inner surfaces of the cover members 18 and 20. Rotary movement of the second coupling member 14 relative to the sealing ledge 60 about a diameter perpendicular to this central axis is permitted by the guiding of the base 106 in the axial groove 108. Thus this sealing ledge arrangement permits an angular offset of the coupling member 10 and 14 relative to each other. The base 106 and ledge 100 permit also limited axial movement of the coupling members 10 and 14 relative to each other.

The sealing surfaces 102 of the intermediate pieces 26A, 26B or 26C have greater widths than the base 106 guided in the second coupling member 14 or the vertical beam of the "T" of the sealing ledge 60. Thereby the pressure of the damping liquid below the "transverse beam of the 'T'" will always exert a resultant contact force, which supports the leaf spring 110 and keeps the sealing ledge 60 in engagement with the sealing surface 102 of the intermeditate piece 26A, 26C or 26C. In addition the axial grooves 108 in which the sealing ledges 60 are guided, can be exposed to hydraulic pressure at their bottoms. The contact surfaces of the sealing ledges 60, i.e., the radially outer surface of the "transverse beam of the 'T'" have greater widths than the sealing surfaces 102 of the intermediate pieces 26A, 26B or 26C. This ensures that, even with an angular displacement of the coupling members 10 and 14 relative to each other about the shaft axis, the sealing ledge 60 engages the sealing surface 102 always on the whole width thereof.

The oil used as damping liquid is supplied by a filling pump (not shown) into a port 120. A check valve 122 is located downstream of this port 120, which is provided axial and central in the hub 16, in an axial passage 124. Radial passages 126 extend from this passage 124 and end on the bottoms of the axially extending recesses 22, each radial passage 126 containing a check valve 128. The supplied oil flows along the recesses 22 past the end faces of the ledges 100 into the partial chambers 64 and 66. As can be seen from FIG. 2, the ledges 100 are slightly shorter than the sealing ledges 60 and the distance of the cover member 18 and 20, in order to permit angular offset and limited axial mobility of the coupling members 10 and 14. Return-flow passages 130 extend from the space in front of the ledges 100, which communicates with the axial grooves 108, to a return-flow port 132.

A restrictor nozzle 133 is located in the return-flow port 132 which takes care of sufficient oil pressure being maintained in the system.

The intermediate pieces 26A are attached to the cover members 18 and 20 by means of screws 134. These screws hold the intermediate pieces and take up the oil pressure forces acting in axial direction, whereby the formation of gaps between the intermediate pieces and the cover members and thus an uncontrolled oil flow therethrough is prevented.

With the embodiment of the invention illustrated in sector B of FIG. 1, an additional U-shaped spring sheet metal strip 136 having shorter legs 138 and 140 is arranged along the inner surface of each one of the said spring sheet metal strips 38 to 48. It is also possible to provide further spring sheet metal strips (not shown) within the spring sheet metal strips 136, the legs of these further strips having progressively short lengths. Thus, each leaf spring means comprises, e.g., abutting long legs 54d and 52e, which engage the recess 22, and short legs 138e and 140d engaging the long legs on both sides. Apart from this, the mounting of the spring sheet metal strips is the same as with the arrangement in sector A.

Pistons 142 are guided in the intermediate pieces 26B for movement in peripheral direction, said pistons extending between short strips 140 and 138 of adjacent leaf spring means. If, for example, the first coupling member 10 is rotated clockwise with the second coupling member 14 held stationary, the long legs 54d and 52e as well as 54e and 52f of the outer U-shaped spring sheet metal strips will be deflected directly. The shorter leg 138a of the inner U-shaped spring sheet metal strip is taken along and is also deflected. Thus, it contributes to the torque transmission. With the conventional arrangements, this would not be true for the short leg 140e. This latter would not be taken along and would be useless for the torque transmission. By means of the piston 142 also, the leg 140e will be taken along by the leg 138e, so that also this leg of the spring sheet metal strip is deformed elastically and contributes to the torque transmission.

This arrangement is, independently of the U-shaped embodiments of the sectors A and B, applicable to all cases, in which each leaf spring of the leaf spring means is composed of at least four stacked radial strips or leaves of spring sheet metal, of which the outer strips, as viewed in peripheral direction, are shorter than the intermediate ones. With the embodiment of the invention, in which each one of the leaf spring means consists of a plurality of separate strips 38 to 48 closing up in axial direction, and in which accordingly a separate piston 142, 144, 146, 148, 150 and 152 is provided for each strip, the characteristic of the coupling may be controlled by the dimensioning of the pistons. This can be done by providing pistons of different lengths. When the leaf spring means 24B are deflected, the distance between adjacent leaf spring means will vary with the degree of deflection. By means of pistons 142 to 152 having different lengths in predetermined steps the various short legs can be "switched on" consecutively. In order to prevent "rattling" of the respective pistons not yet switched on, a coil spring 143 may be arranged between each shorter piston 142 and a respective adjacent leaf spring means 24B, said coil spring 143 being guided in a blind bore of the piston 142.

With the embodiment in accordance with sector C of FIG. 1, the intermediate pieces 26C are provided with radially extending longitudinal slots 154, each intermediate piece having a conical aperture 156 intersected by this longitudinal slot. A bolt 158, which tensions the two cover members 18 and 20 arranged on both sides of the outer ring 12 towards each other, extends through the aperture with a correspondingly conical shaft, whereby the two portions 160 and 162 of the intermediate pieces 26C located on both sides of the longitudinal slot 154 are expanded in peripheral direction. With the embodiment illustrated in sector C of FIG. 1, the leaf spring means 24C are formed by radial leaf springs or stacks of leaf springs 164 and are clamped with their outer ends between adjacent intermediate piece 26C. The intermediate pieces 26C are integral elements but are provided with the longitudinal deadend slots 154 extending from their outer peripheral surfaces 166. The intermediate piece 26C is attached at its radially inner portion, to the cover members 18 and 20 by a screw 168.

With the embodiment illustrated in sector D of FIG. 1, the intermediate pieces 26D consist of three parts each. A first and a second part 170 and 172 are arranged radially outwards and are shaped symmetrical to the radially extending longitudinal slot 154 formed therebetween. A third, radially inner part 171 is attached to the cover members 18 and 20 by means of three screws 173.

With these embodiments the forces acting in peripheral direction are transmitted positively from the leaf spring means 24C through the intermediate pieces 26C and 26D and the bolt 158 and the screws 173 to the cover members 18 and 20.

With one embodiment illustrated in sector C of FIG. 1, the side faces of the intermediate pieces 26C facing the leaf spring means 24C are shaped to form convex support surfaces 174. This can be achieved in that the leaf spring means 24C in their position of rest are tangential to the support surfaces 174 and the support surfaces 174 are curved such that, with deflection of the leaf spring means 24C, progressively increasing lengths of the leaf spring means 24C abut the support surfaces 174. Thus the effective length of the leaf spring means 24C is reduced with increasing deflection, i.e., the leaf spring means 24C and thus the shaft coupling become progressively harder with increase of the transmitted torque, until the maximum permissible torque the leaf spring means 24C engage the support surfaces 174 practically along their whole lengths and are supported thereby rigidly. This prevents the leaf spring means from bending up to permanent deformation under the action of large torque.

It is, however, also possible that the support surfaces 174 have the form, which the leaf spring means 24C adopt upon application of the maximum permissible bending load. With such a shape of the support surfaces 174 the leaf spring means 24C are substantially freely deflectable within the normal range of torques of the coupling, which results in a yielding coupling having a substantially linear spring characteristic. Deformation of the leaf spring means beyond the elastic range is prevented by the leaf spring means engaging the support surface 174 along substantially its total length under the action of the maximum permissible torque.

The connecting passages 70C end in the support surfaces 174. To make sure that the connecting passages 70C will not be shut off by the leaf spring means, notches 176 are provided in the support surfaces 174. The notches extend to a plane normal to the axis of rotation of the shaft coupling and communicate with the connecting passage 70C.

There may be cases in which the coupling member 10 is not mounted in separate bearings but has to be supported radially on the coupling member 14 in appropriate manner. Then no radial offset between the coupling members is provided, but it is desirable, that the shaft coupling permits angular offset. As has been shown in FIG. 2 on the top, this can be achieved by supporting one of the central strips 42 of each leaf spring arrangement with a rounded inner end 178 on the bottom of the associated axially extending recess 22.

Thus the elastic coupling of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An elastic coupling comprising:
a first coupling member;
a second coupling member located radially inward of said first coupling member;
a plurality of substantially radially extending leaf spring means connecting said first and second coupling members; and
intermediate pieces located between peripherally adjacent leaf spring means, each of said intermediate pieces further comprising:
a radially outer surface;
a radially extending slot communicating with said radially outer surface thereby dividing a radially outer part of said intermediate piece into first and second portions on either side of said radially extending slot;
an axially extending conical bore disposed in said intermediate piece transverse to and communicating with said radially extending slot; and
an axial bolt having a conical shaft disposed in said conical bore so that upon tightening said bolt, said first and second portions of said intermediate piece are spread peripherally apart thereby clamping each of said leaf spring means between adjacent intermediate pieces.

2. The coupling member of claim 1 wherein each of said intermediate pieces further comprise a third radially inner portion engaging said first and second portions and connected to said first coupling member.

* * * * *